United States Patent [19]
Weatherill

[11] Patent Number: 5,881,149
[45] Date of Patent: Mar. 9, 1999

[54] PORTABLE COMMUNICATIONS DEVICE WITH WIRELESS TRANSMITTER AND DETACHABLE EARPIECE INCLUDING A WIRELESS RECEIVER

[75] Inventor: Neil K. Weatherill, Leyton, Great Britain

[73] Assignee: U.S. Philips Corporation, New York, N.Y.

[21] Appl. No.: 702,641

[22] PCT Filed: Jan. 5, 1996

[86] PCT No.: PCT/GB96/00011

§ 371 Date: Sep. 6, 1996

§ 102(e) Date: Sep. 6, 1996

[87] PCT Pub. No.: WO96/21307

PCT Pub. Date: Jul. 11, 1996

[30] Foreign Application Priority Data

| Jan. 6, 1995 | [GB] | United Kingdom | .................... | 9500192 |
| Mar. 27, 1995 | [GB] | United Kingdom | .................... | 9506221 |

[51] Int. Cl.[6] ...................................................... H04M 1/00
[52] U.S. Cl. ........................... 379/433; 379/430; 379/447
[58] Field of Search ..................................... 379/433, 434, 379/428, 420, 430, 449, 447; 455/89, 90

[56] References Cited

U.S. PATENT DOCUMENTS

| 5,128,981 | 7/1992 | Tsukamoto et al. ..................... 455/557 |
| 5,265,264 | 11/1993 | Dzung et al. .............................. 455/90 |
| 5,475,872 | 12/1995 | Sato ......................................... 379/430 |

FOREIGN PATENT DOCUMENTS

| 624021 | 11/1994 | European Pat. Off. . |
| 626773 | 11/1994 | European Pat. Off. . |
| 2706103 | 9/1994 | Germany ................................ 379/433 |
| 3-162021 | 7/1991 | Japan ........................................ 455/89 |
| 4056530 | 2/1992 | Japan ...................................... 379/433 |
| 2277422 | 10/1994 | United Kingdom . |
| WO9423520 | 10/1994 | WIPO . |

OTHER PUBLICATIONS

"Recessed Earphone with Automatic Selection For Voice Pager"— Hedayatnia, Motorola Tech. Developments, vol. 11, Oct., 1990, pp. 13–15.

*Primary Examiner*—Jack Chiang
*Attorney, Agent, or Firm*—Steven R. Biren

[57] ABSTRACT

The invention relates to a device for receiving and/or sending communication signals and consists of at least two parts, a first detachable part and a second, body part. The first part can be moved to an in use position whereby the same is placed on or to the ear of the user to allow information received via the communication signals to be listened to via a speaker in the part. The part includes a receiver to receive communication signals from either or both of the body part which in turn receives signals from a remote point or directly from the remote point. The first part is physically separated from the body part in use and therefore no wire, cable or other physical connections are required therefor providing considerable advantage over known two part communication devices all of which require some form of physical connection. The body part can include a device for transmitting communication signals.

11 Claims, 14 Drawing Sheets

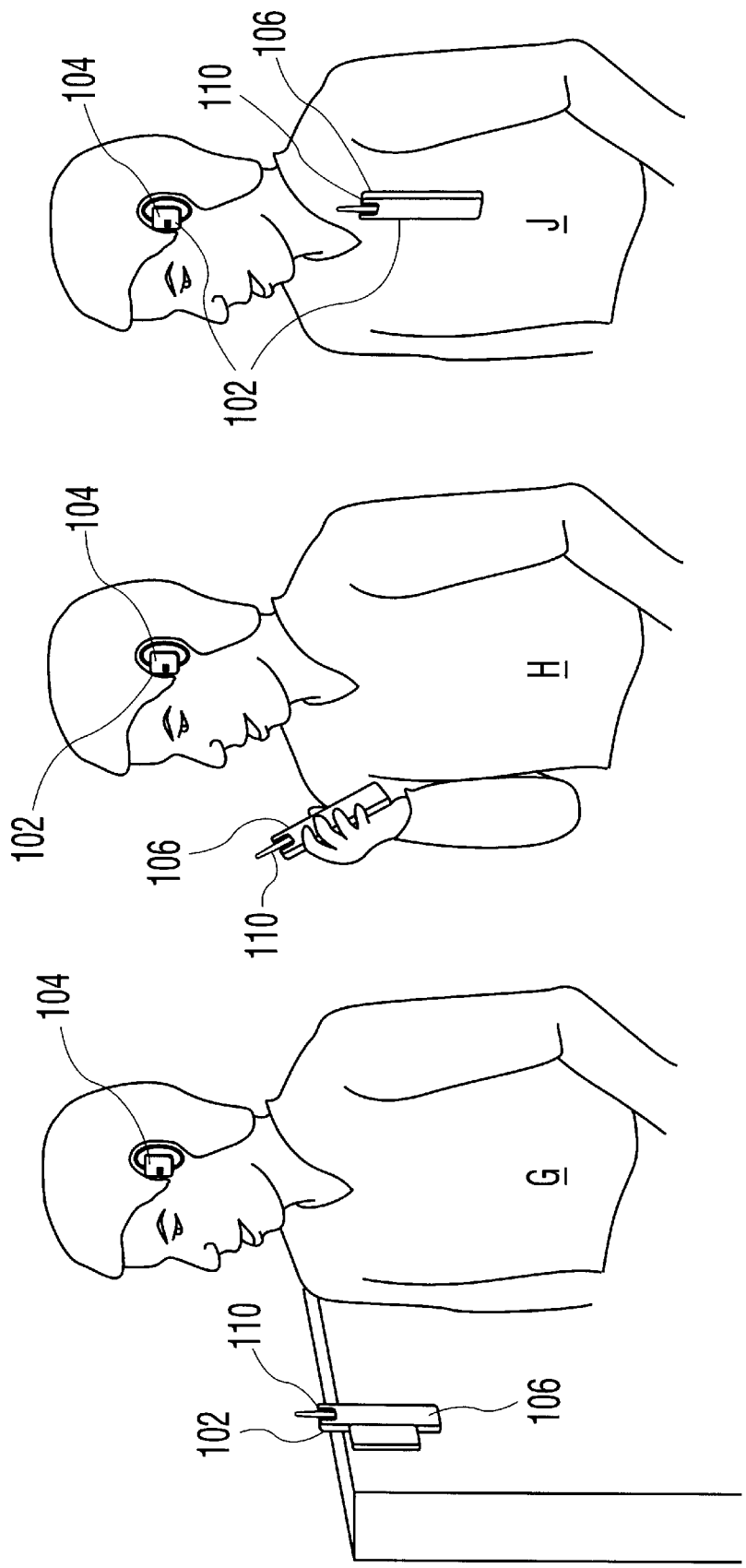

PORTABLE COMMUNICATIONS DEVICE WITH WIRELESS TRANSMITTER AND DETACHABLE EARPIECE INCLUDING A WIRELESS RECEIVER

BACKGROUND OF THE INVENTION

1. Field of the Invention

This invention relates to a portable communication device, at least part of which can typically be worn on the anatomy of a person such as the ear; and in particular to such a device which includes a detachable part which even when physically detached is still connected to the device but not by any physical connecting means.

2. Description of the Related Art

Devices are known for use by a person to listen to prerecorded or received radio signal information which is relayed to the person by a speaker mounted in the device. The device can be provided with any, or all of, controls for controlling the volume of information sent through the speaker; the playing, stopping, fast forward or rewind of prerecorded information; and the tuning of a receiver to receive information at a certain frequency.

Another well known type of communications device is the portable, or mobile, phone. A common problem with the portability of these devices is that they are required to be provided with integral mouth and ear pieces. Even when the ear piece and mouthpiece are provided at the extreme ends of the device or the mouthpiece is provided as part of a flap which is unfolded for use, the size of the phone is determined by the requirement to have the mouthpiece and ear piece spaced apart in a manner that the device can be comfortably used.

SUMMARY OF THE INVENTION

An object of the present invention is to provide a portable communication device having a detachable part which can be placed against the ear for use but preferably is attached to the ear to be ear held, and a part which provides further utilities. Such a communication device allows communication functions to be provided such as any, or any combination of 1-way or 2-way paging and/or mobile telephone or radio functions, thus providing a device which can be usable to transmit information by the wearer of the device. In a further feature the device can also be held in an unobtrusive stored position and worn by the wearer such as, for example, as part of a wrist watch, until a signal is received. At that point at least part of the device can, if the wearer so wishes, be removed and placed on the ear to receive the message. Thus the device has two parts, a body part which includes the mouthpiece and which can be used separately from the other part which includes the ear piece.

The present invention, in a portable first aspect, provides a communication device including means for receiving a communications signal and a speaker for relaying the communication received to the user said device includes a first part which is detachable and at least a second part, the first part to be retained on, and/or placed to, the ear of the user during use. Thus, in an in use position the first part can be remote from the remainder of the device.

The first (detachable) part is physically remote from the body part of the device in that it is not required to be physically connected to the body part of the device when in use.

In one embodiment the first part is shaped with retaining means as an integral part thereof to allow the first part to be retained on the ear. Preferably the retaining means contact directly with the ear only and require no other retention means to be provided and are not required to be in contact with any other part of the wearer's body.

In one embodiment the retention means are retracted when the device is in a stored position.

In one embodiment the body part is provided with a strap to be worn in a manner similar to a wrist watch. In one embodiment the device is provided as part of a wrist watch, with the part to be worn on the ear located around the face of the same. In an alternative embodiment the device can be stored by being hung as a pendant such as from a chain, cable or wire. In one embodiment the cable, chain or wire can act as an aerial for the device to receive communication signals therefor.

In one embodiment the device is provided with a sound and/or light emitter to emit an information sound or light when a signal is received, and a signal receiver to either store or simultaneously relay the signal and information received. When the information is stored the same can be played back once the person has placed the detachable, first part on the ear.

In a portable further aspect of the invention there is provided a communications device having at least two parts for sending and receiving information, said device including a signal receiver and a signal emitter to enable information to be received and information to be transmitted from the device, thereby providing two-way communications. A first part, including a speaker, of the device is detachable against be placed to or on the ear of the user for listening to the information received.

Typically the detachable part comprises a speaker, an information signal receiver and optionally a signal storage means, and a shaped retention portion to allow the same to be retained on the wearers ear. The detachable part is typically provided with a receiver to receive information emitted from the remainder of the device and/or signals received directly from the source of the broadcast signal.

In a further aspect of the invention there is provided a communications device which includes a first part which can be moved to the ear and/or mouth, and a second part capable of receiving and/or sending communication signals to allow information to be relayed via the first part to and/or from the user.

In one embodiment the communications device includes at lease two parts respectively for sending and receiving information, said device being provided for the reception and emission of telecommunication and/or radio signals. Such a device can be operable as a mobile telephone or radio for long or short distance communication and transfer of information, and wherein at least one part of the device is detachable to be worn on the persons ear.

Typically the detachable part includes a speaker by which received information can be relayed to the persons ear and is provided with a receiver for receiving communication signals from the remainder of the device and/or communication emitted from the source of the telephonic or broadcast signal.

In one embodiment the second, (body) part of the device is worn by the person or can be hand held and includes a microphone into which the person can speak to send information. In one embodiment the second part can incorporate a dial pad or voice recognition system to allow recipients of information to be selected and their telephone numbers dialled.

The invention provides a portable communications device which can, in one particularly advantageous embodiment, be provided in a form for use as a mobile phone which includes a cordless detachable part which incorporates a speaker and which can be worn on the users ear. When the first part is attached to the second part it can have the appearance of and be usable as a conventional mobile phone.

In one form of this embodiment of the invention the device can be used in a "hands free" mode. In one embodiment the detachment of the first part from the second (body) part of the device causes the mouthpiece on the body part, including a microphone, to be more sensitive to noise. This allows the user of the device to place the body part of the device a distance away, for example in the range of 0–1 rmetres from the mouth, and still be operable without the need for the conventional, costly, additional equipment to be provided.

In an alternative embodiment the detachment of the first part from the second (body) part allows a second microphone to be operable which is more sensitive than the first microphone and allows the second part to be used remote from the first part. This is especially useful when used during walking or other activities. Preferably a selection switch is provided to allow selection to be made between microphones if two or more are provided.

In a further aspect of the device of the invention it can be provided as an integral element of a computer the first (detachable) part is housed on the body of the computer and can be removed therefrom to allow the same to be moved to an in use position on the wearer, and the second (body) part of the device is housed within or on the computer.

In this embodiment the first part includes a speaker which can be used to listen to communication signals such as telephonic or broadcast signals whether they be mobile phone signals or other telecommunication signal or, alternatively, or in addition, can be used to listen to computer generated commands and signals or games and music such as those generated by the commuter on which the device is provided.

Reference herein to computers includes any type of computer such as desktop, laptop computers for use in the home or office, electronic organisers and computer games consoles. Similarly the device can also be incorporated in a similar manner in facsimile machines or other telecommunications equipment such as telephones wherein the handset is disposed of and replaced by a first part which is adapted to be worn on the ear and a second part which includes a microphone for receiving voice communication from the user of the device and which can be incorporated in the body of the device.

In whichever aspect of the invention, the device preferably includes rechargeable power cells or batteries which may be automatically recharged by clipping the first (detachable) part in position in the second (body) part of the device.

The invention provides a communication device which can receive information and, in certain aspects, can be used to transmit information and comprises at least two parts which are operable in combination but in a physically detached manner and therefore there is no need for connection by wire or cables between the parts. Thus the device can be used as a pager, a two way pager, a mobile telephone with no hand operation required by the person who is wearing the device or can be incorporated into an electronic organiser or computer. This is in contrast to conventional communication devices which are required to be hand held or secured to a nearby surface thereby limiting the persons movements during operation of the device.

Thus the invention provides in its broadest aspect a communications device which can be split into at least two parts, a first part which can be worn on the ear and includes an ear piece element, and can receive and/or transmit information to the second part of the device. This second part can transmit information to the first part, and/or can include a mouthpiece or microphone and means for dialling communication numbers. It can be used remote from the first part.

BRIEF DESCRIPTION OF THE DRAWINGS

Preferred embodiments of the invention will now be described with reference to the accompanying drawings, wherein;

FIG. 12 illustrates the device in hands free mode;

FIG. 13 illustrates the device in another mode of use;

FIG. 14 illustrates the device in a second mode of "hands free" use;

DESCRIPTION OF THE PREFERRED EMBODIMENTS

Figure 1A:
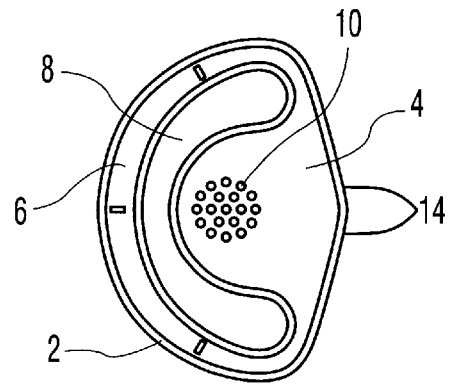
FIGS. 1A–1D illustrate a first (removable) part of a communication device according to a first aspect of the invention.
Figure 1B:
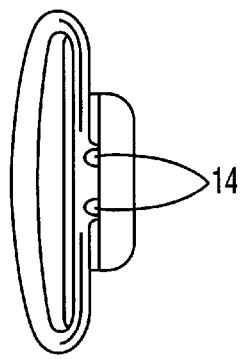
Figure 1C:
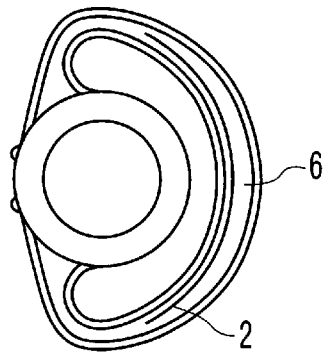
Figure 1D:
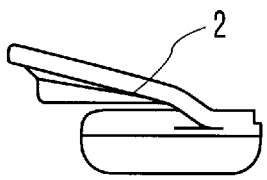

Referring firstly to FIGS. 1A–1D there is shown a first part 2 of the communication device according to a first aspect of the invention. The part includes a moulded plastic main body 4 which includes a shaped portion 6 which defines a slot 8 between the portion 6 and the body 4. The slot 8 and portion 6 are shaped to allow the part to be placed and retained on a persons ear. Within the body 4 there is provided a speaker 10 for the playing of information into the persons ear and also a sound and/or light emitter to emit a sound and/or light to inform the person when a message is received by the signal receiver within the part either from another part of the device or from a point remote to the person wearing the part. The part includes control means 14 to allow the device mode to be selected to provide immediate playback of the message received or to store the message in a memory chip within the housing until the person is ready to receive the message. The controls can also include volume control and an on/off switch.

Figure 2:
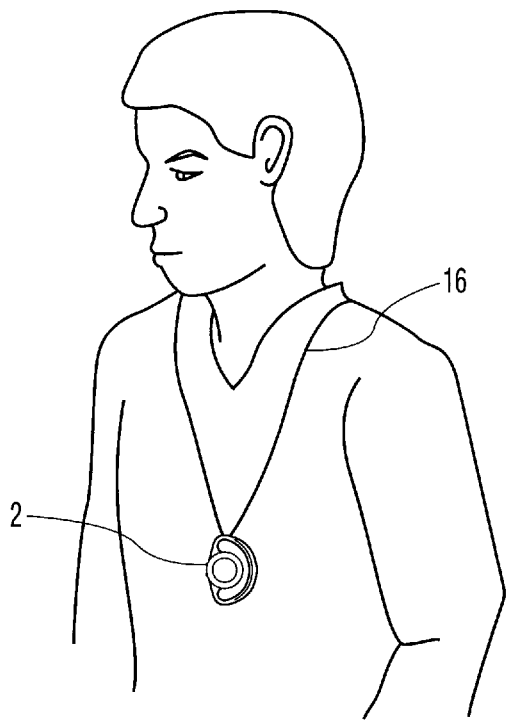
FIG. 2 illustrates the first part of the device as shown in FIGS. 1A–1D when not in use and in a stored position.
Figure 3:
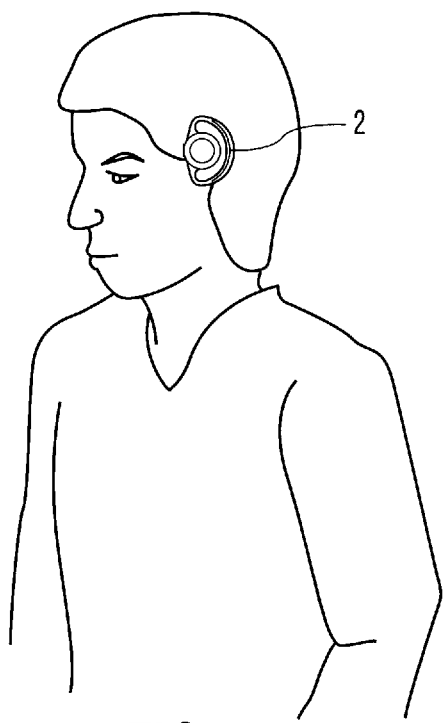
FIG. 3 illustrates the first part of the device of FIGS. 1A–1D in use to listen to information.

Referring now to FIGS. 2 and 3, the device, when not in use, can be worn from a chain, cord or wire 16 as shown or could be worn as a badge or carried in a pocket or handbag. In one embodiment the cable, wire or chain from which the device is suspended can be connected thereto to act as an aerial for the device for receiving communications signals.

Typically the device is provided with a light or noise emitter such that upon hearing a noise or seeing a light emitted from the device the person is made aware that a message has been received by the device. The person may then select to enter the message received into the device memory for playback later or place a part of the device onto their ear as shown in FIG. 3. When the person is ready they can then operate the controls for playback and/or the reception of further live messages via the speaker 10. The communication signals can be radio signals or any other form of communication carrying signal such as telephonic or broadcast signals.

Figure 4:
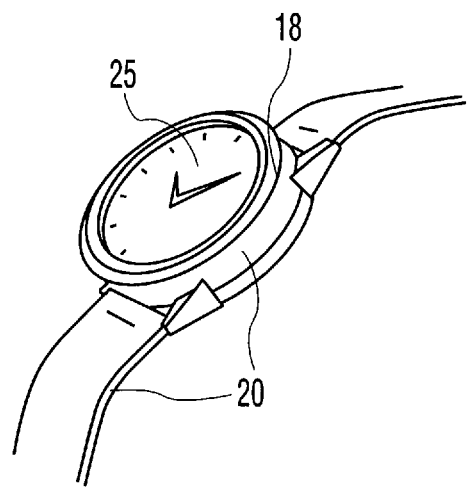
FIG. 4 illustrates an aspect of the device of the invention in a stored condition.
Figure 5:
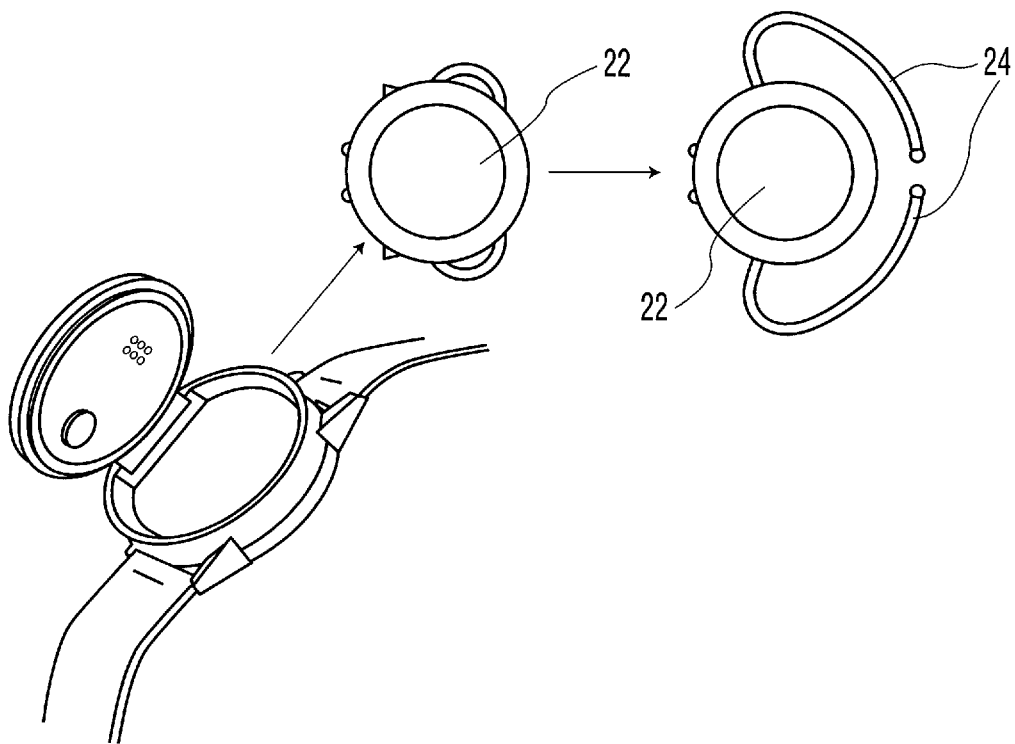
FIG. 5 illustrates the device of FIG. 4 in transition from a stored to an in-use position.
Figure 6:
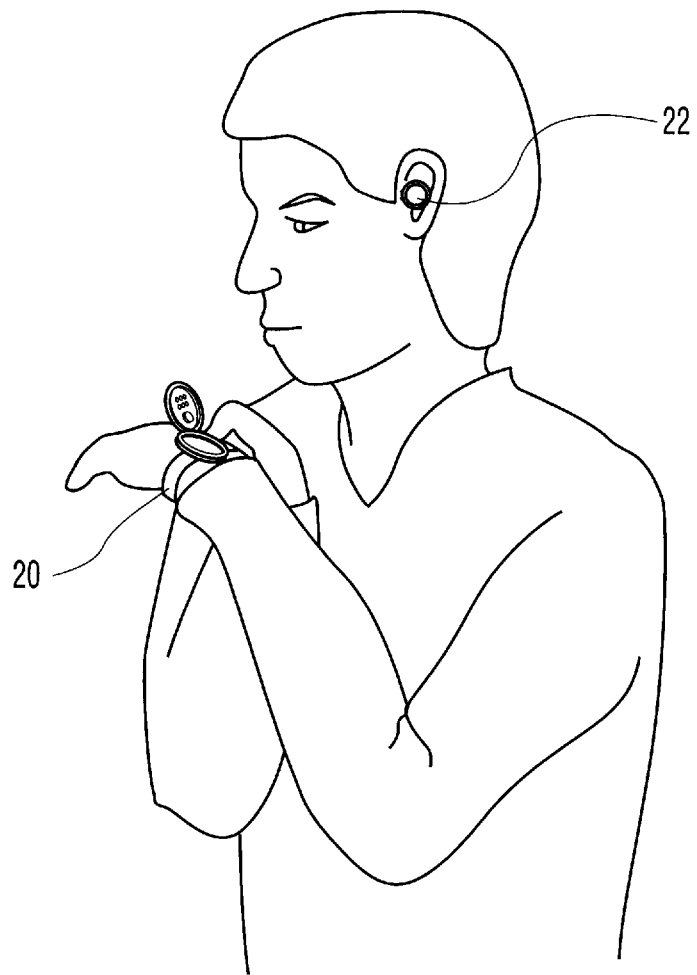
FIG. 6 illustrates the device of FIG. 4 in use.
Figure 7D:
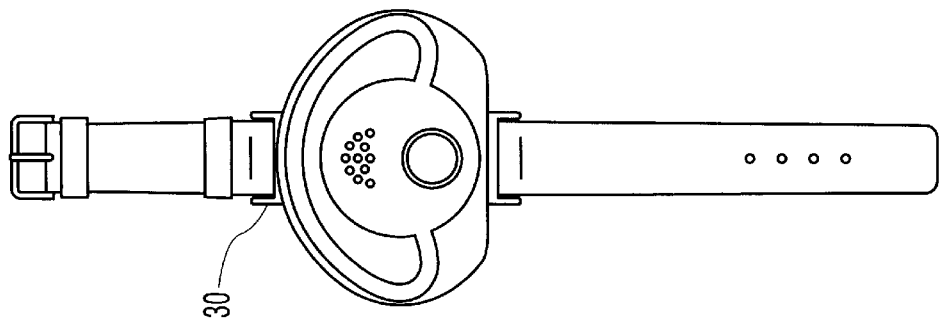
FIGS. 7A–7D illustrate a further embodiment of the device of the invention.
Figure 7C:
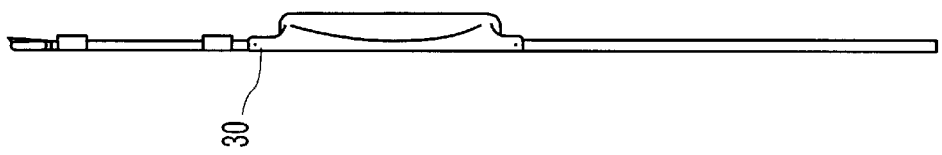
Figure 7B:
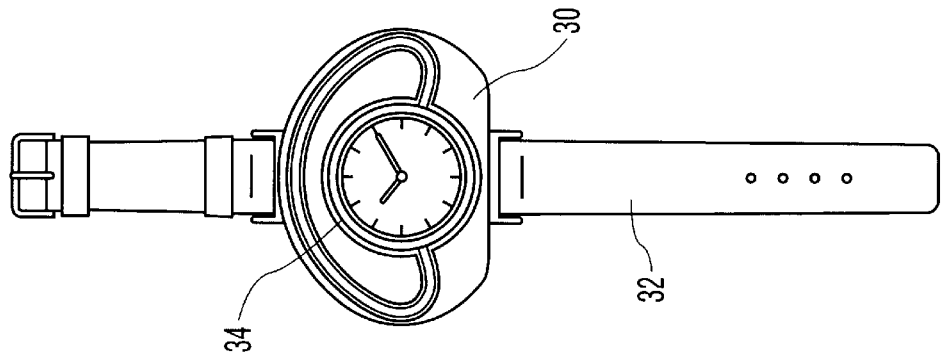
Figure 7A:
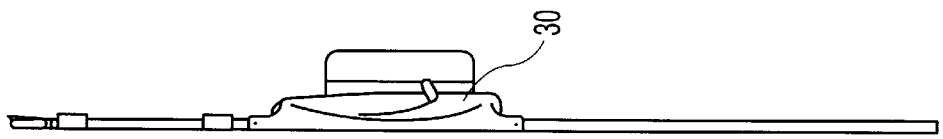

A device in one aspect of the invention is illustrated in FIGS. 4–6. This device 18 comprises at least two parts, a body part 20 which allows, in this embodiment, the device to be worn on the wrist and a first, (detachable) part 22 shown in FIGS. 5 and 6. In the embodiment shown the body part includes a wrist watch 25 such that when the device is in a stored position as shown in FIG. 4 it operates as a conventional wrist watch. In this embodiment the body part 20 includes an transmitter whereby messages and communication signals can be transmitted to other parties and either/or both of the parts 20,22 includes a signal receiver whereby messages can be received.

The detachable part 22 also includes a sneaker and a shaped portion 24 whereby the part can be supported on the user's ear by means of the shaped portion 24 as shown in FIG. 5 and 6. Messages received by the device can thereby be listened to via the speaker.

In use the user receives an indication that a message has been received by means of a noise or light provided on the device 18. The user then opens the device to remove the first, detachable part 22 and open out the shaped portion 24 as shown in FIG. 5. The part 22 is then placed on the user's ear as shown in FIG. 6 and the message received can be listened to as previously described. If the signal receiver is mounted in the body part 20 the first, detachable part 22 is also provided with a receiver and the body part a transmitter to allow the first part 22 to receive the relayed signal from the body part 20. By using the detachable part 22 on a ear and the body part 20 on the wrist which includes a signal transmitter and can also include a microphone, the user can communicate with the party sending the message as illustrated in FIG. 6. The detachable part is however physically remote from the body part during use and therefore the device is significantly easier to use and is also more convenient for use than conventional wire or cable connected devices.

Figure 8A:
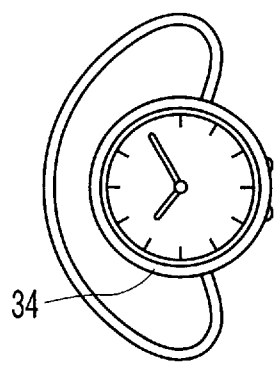
FIGS. 8A–8C illustrate the detachable part of the device of FIGS. 7A–7D when detached for use.
Figure 8B:
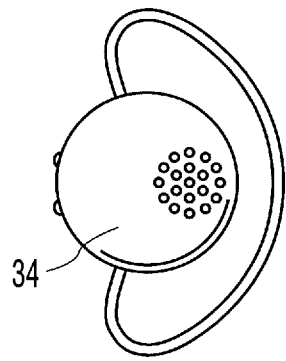
Figure 8C:
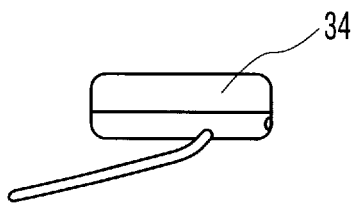

FIGS. 7A–7D and 8A–8C illustrate a further embodiment of the invention wherein the device 30 includes a first, detachable part 34 which is illustrated as part of the device in a stored condition in FIGS. 7A–7D and in a detached condition in FIGS. 8A–8C, and a body part 32. Again the device is shown in the embodiment of a wrist watch such that when the same is in a stored position as shown in FIGS. 7A–7D the device operates as a conventional wrist watch. In this embodiment the device operates as a mobile telephone or radio with full transmission and reception capabilities which allows the person to select a number or frequency and initiate the sending of messages. The device can include a dial pad or a voice recognition system so that the user can speak the number required into the body part 32 which includes a microphone and speak to the other party there through while listening by detaching the detachable part 34 with the speaker thereon and placing the same to their ear.

Figure 10:
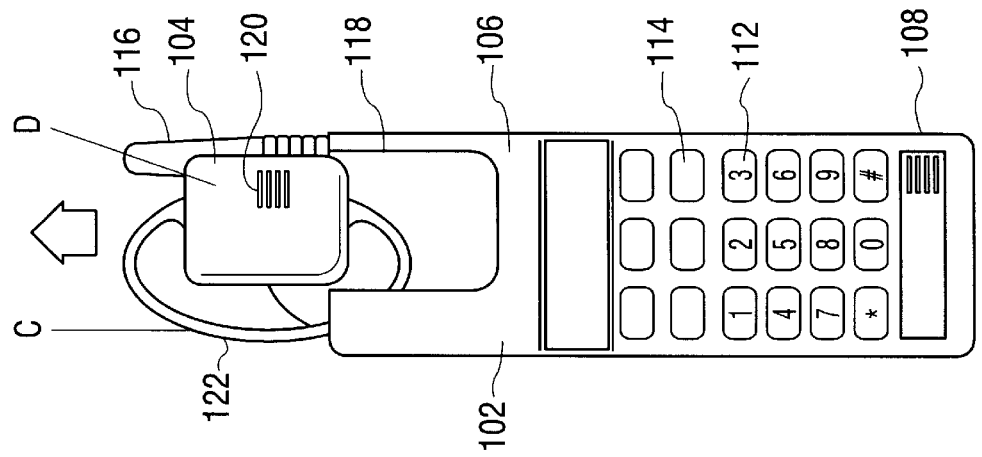
FIG. 10 illustrates the device of FIG. 9 with a first part partially removed.
Figure 9:
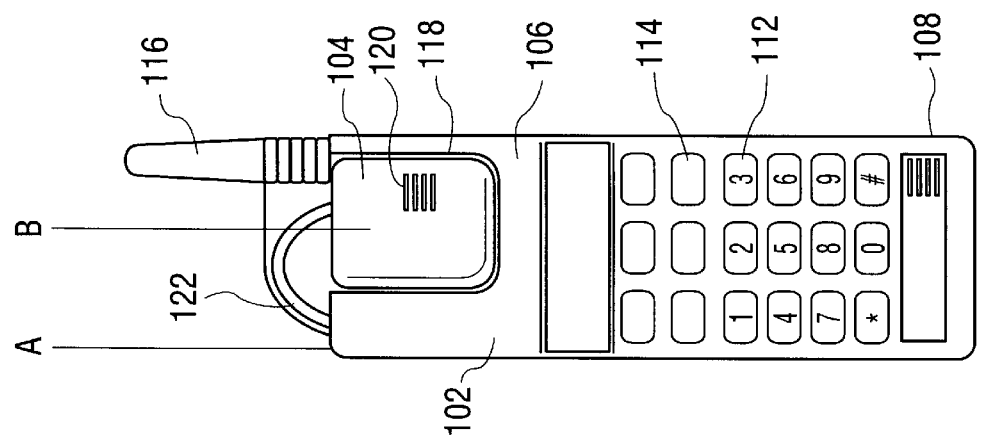
FIG. 9 illustrates a communication device in accordance with one aspect of the invention in an assembled condition.

Referring now to FIGS. 9–11 there is shown a communications device 102 according to an aspect of the invention wherein the device includes a first, detachable part 104 and a second, body part 106. The second body part 106 includes a mouthpiece 108 incorporating a microphone and, in this embodiment, a second microphone 110, the use of which is explained in greater detail below. The body part also includes a key pad 112 to allow communication numbers to be dialled, other controls 114 for the provision of functions such as on/off, send and redial facilities and an aerial 116 for the reception of incoming communication signals and the transmission of outdoing communication signals. The first part 104 of the device is mountable in the slotted aperture 118 of the body part 106. The first part 104 includes an ear piece 120 with a speaker and also means (not shown) for the reception of communication signals either from the second body part 106 or directly from remote sources and the communications received are played through the ear piece speaker. The first part 104 is also provided with mounting means 122 which allow the part 104 to be worn on the users ear without the need to hold the same in position.

Figure 11B:
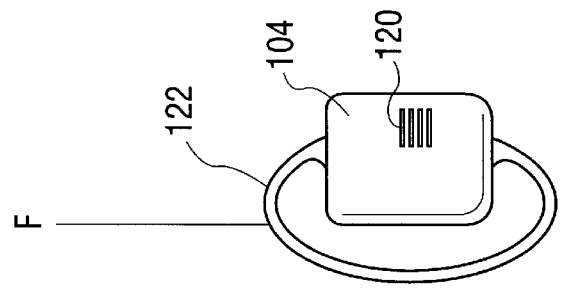
FIGS. 11A and 11B illustrate the device in FIGS. 9 and 10 in two parts.
Figure 11A:
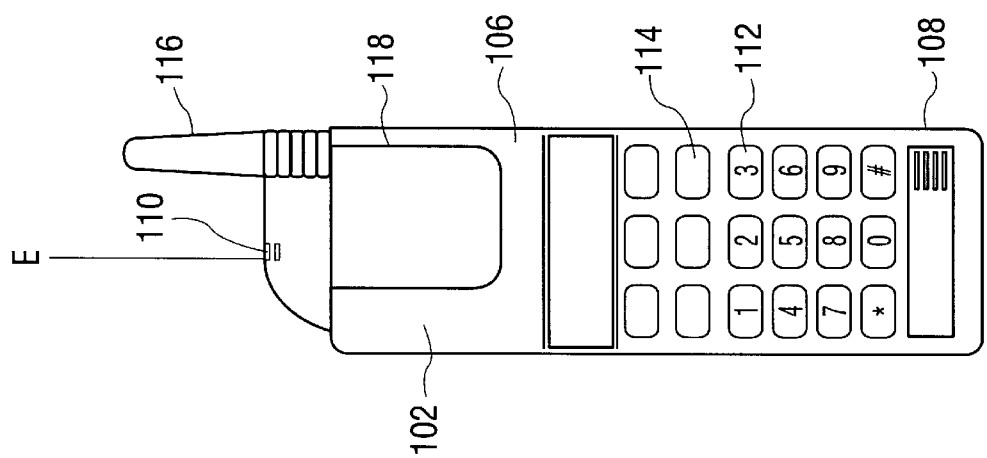

The device 102 in the embodiment shown can be used as a one piece device as shown in FIG. 9 wherein the first part 104 is provided as part of the second body part 106 and wherein the device is operable as per a conventional mobile phone which is sufficiently well known so as not to require explanation herein. Alternatively the first part 104 can be removed from the second body part 106 by sliding the same out of the aperture 118 as shown in FIG. 10 to provide a device as shown in FIG. 11A and 11B wherein the first part 104 is remote from the second body part 106. While the operation of the device is still as per a conventional mobile phone, the removal of the first part 104 allows the same to be worn on or placed to the users ear remote from the body part 106 as shown in FIGS. 12–14.

In FIG. 12 the first part 104 is shown mounted in position on the users ear with the sneaker therein adjacent the ear. In this use the second body part 106 is positioned remote from the user such as on the dashboard of a vehicle. In this use the second microphone 110 can be selected to be operable as the removal of the first part 104 exposes this microphone. It is typically more sensitive and can therefore pick up the users voice without the need for the same to be placed close to the users mouth. Thus, the device can be used hands free as is also shown in FIG. 14 where the second body part 106 is shown in use and placed in the users pocket and, with the second microphone 110 exposed, the device can be used even while the user is walking around or working.

In FIG. 13 the device is used with the first part 104 mounted on the users ear and the second body part 106 held in the users hand and in this form either of the microphones 108 or 110 can be selected to be operable.

Figure 15:
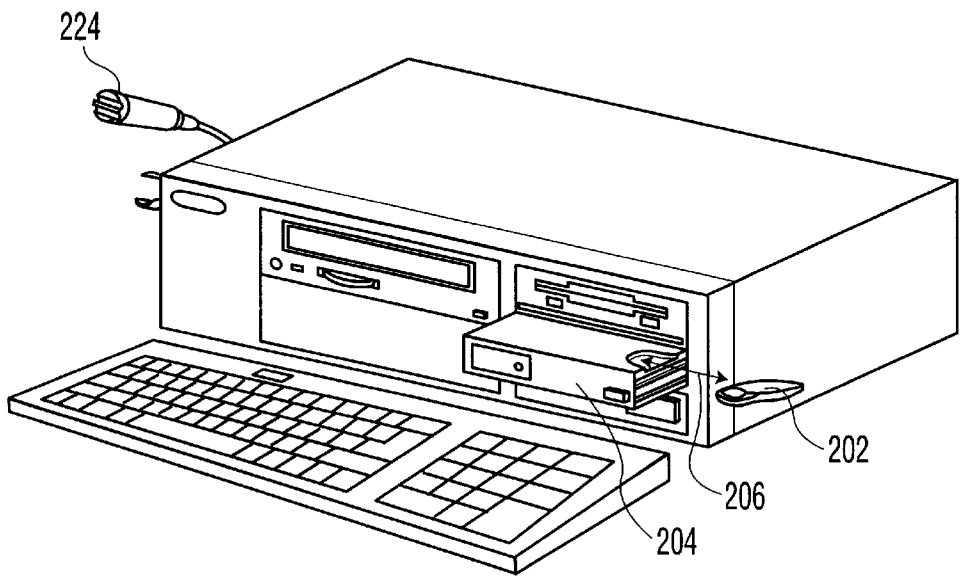
FIG. 15 illustrates the device in one mode of use as part of a computer of the desktop type.
Figure 16:
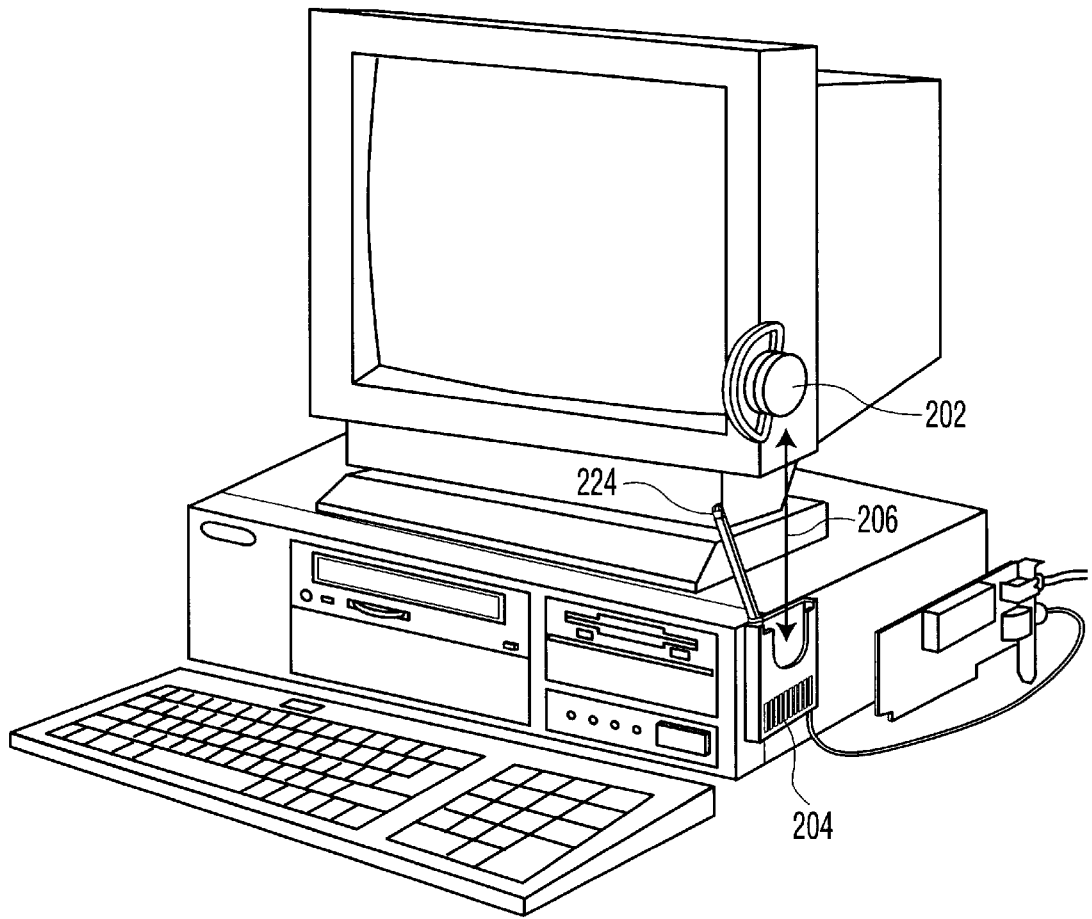
FIG. 16 illustrates the device in an alternative embodiment to be fitted to a computer of the desktop type.

Referring now to FIGS. 15 and 16 there are shown two embodiments of the device provided as part of a desktop computer wherein the device includes a first detachable part 202 and a second part 204 within which the first part 202 can be stored when not in use as indicated by arrow 206. In FIG. 15 the second part 204 is provided in the form of a standard size 3.5 inch floppy disc drive which can be plugged into an available drive bay and connected internally to a special accessory printed circuit card that is plugged into one of the expansion slots available inside the PC. The effect created is thus for the computer to have a speaker which in normal operation emits sound from the front of the PC body but also to provide the device of the invention such that the part 204 can be ejected from the bay in the commuter and the first part 202 removed to allow the same to be worn on the ear whereupon the speaker on the computer will close and the sound listened to via the speaker in the detachable part 202 in that manner. The transmission of the signal from the body part to the first part can be by any normal media such as radio signals or infrared to avoid the risk of interference with the computer electronics. In FIG. 16 the same principles apply but in the embodiment shown the part 204 is in the form of an interface card which fits within the computer and the first part 202 is mounted externally of the computer housing.

Figure 17:
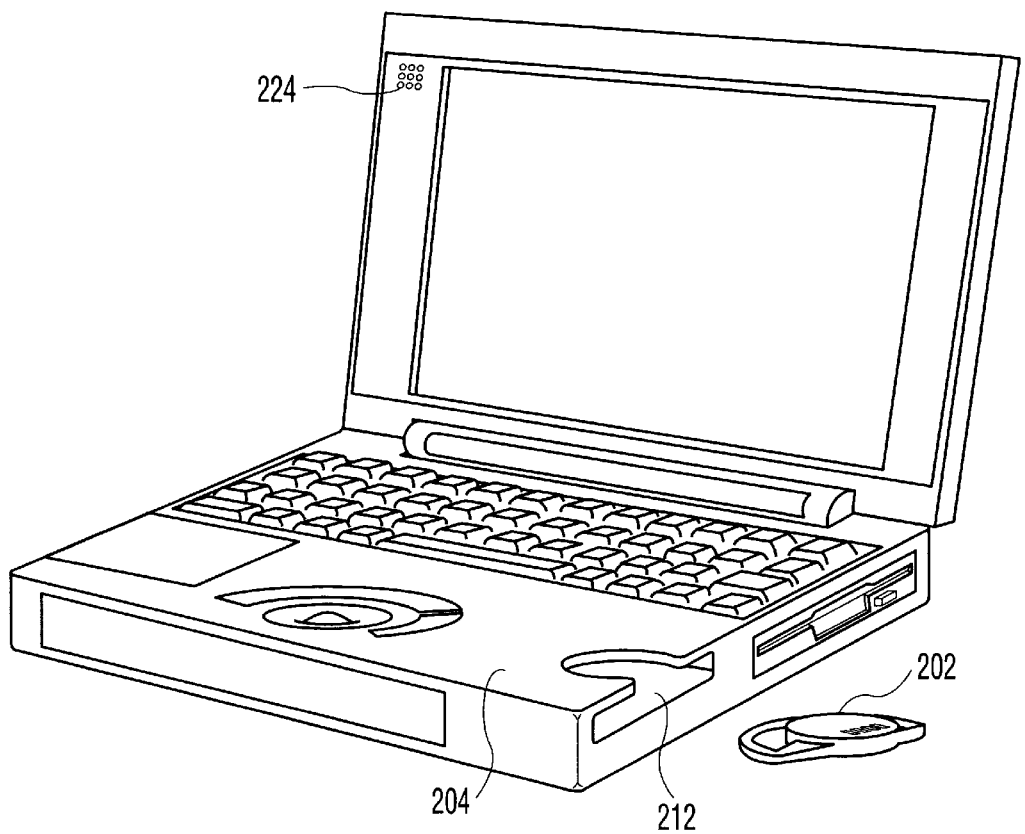
FIG. 17 illustrates the device provided as part of a laptop computer.

FIG. 17 illustrates the device of the invention provided as part of a laptop computer 210 wherein the first part 202 is housed in the second (body) part 204 in a location slot 212 therein. Thus, whereupon the device operates in the same manner as described in FIGS. 15 and 16.

In whichever embodiment the commuter can be further provided with a microphone 224 inbuilt or provided as a movable part thereof as per the embodiments shown in the FIGS. wherein the user can send messages using the device by speaking into the microphone whereupon the device transmitter transmits the signals to the desired recipient.

Figure 18A:
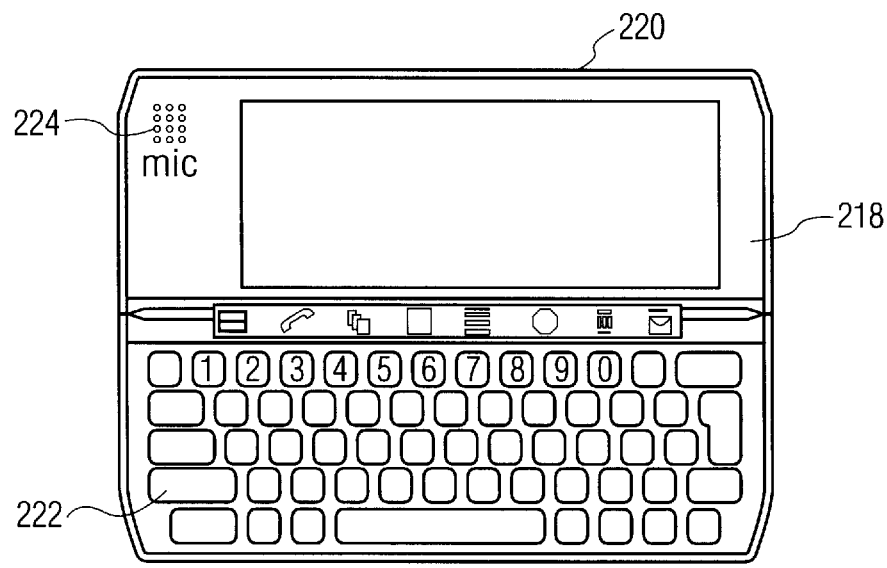
FIGS. 18A–18D illustrate the device provided as part of an electronic organiser.
Figure 18B:
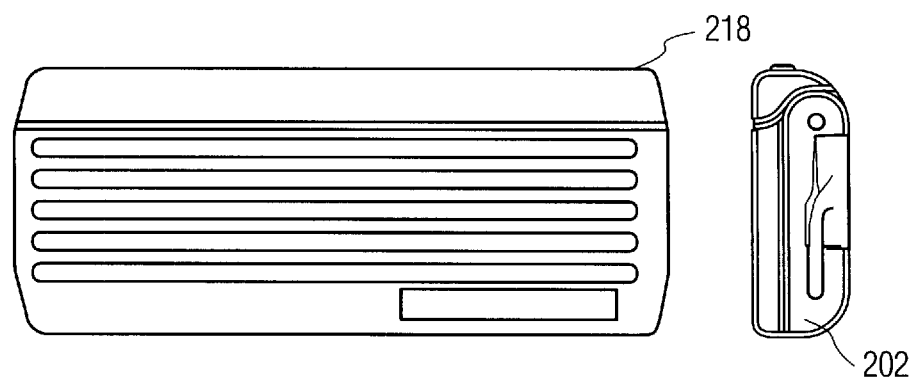
Figure 18C:
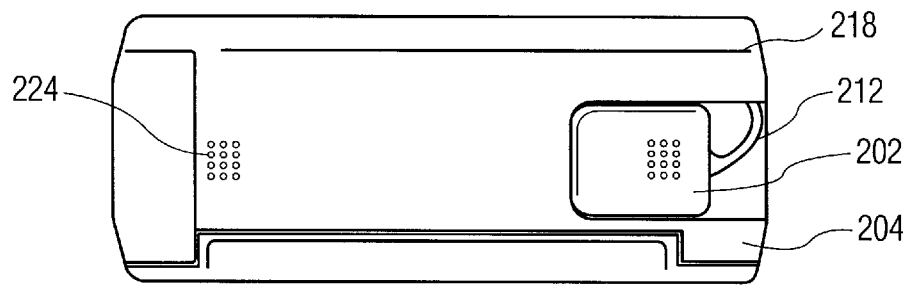
Figure 18D:
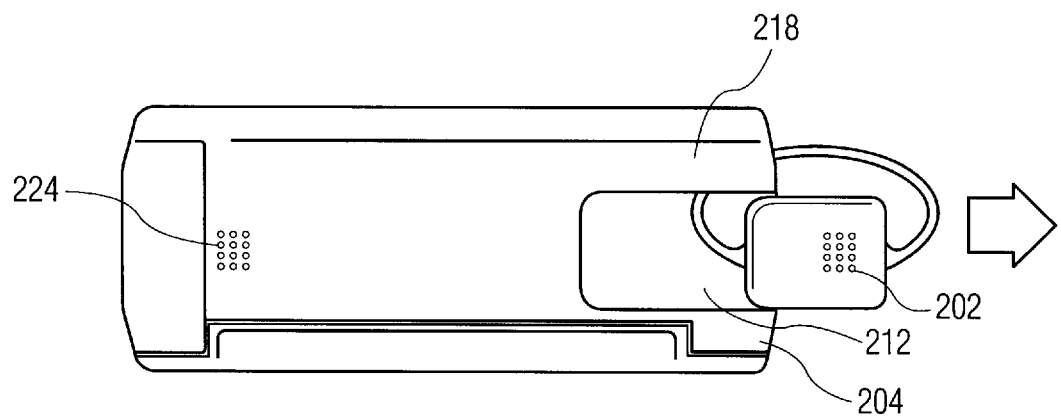
Figure 19:
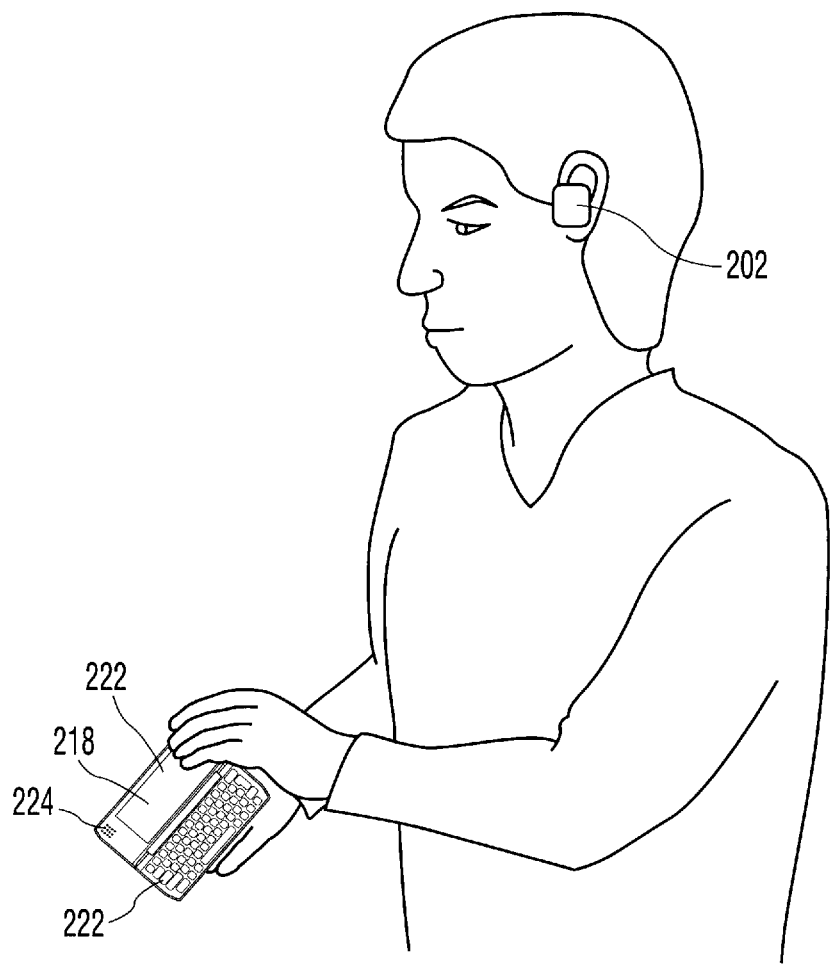
FIG. 19 illustrates the device of FIGS. 18A–18D in use in one embodiment.

FIGS. 18A–D and 19 illustrate the device of the invention incorporated as part of an organiser 218 which is shown to include the standard feature of a screen 220 and a keyboard 222 and, in this embodiment, also includes microphones 224 which are positioned to allow the device to be used when the organiser is closed as shown in FIGS. 18B–18D or in an open position as shown in FIGS. 18A and 19. In use, the first part 202 can be removed from the second part 204 which is provided as an integral part of the organiser 218 which includes a location slot 212 for the first part and worn on the ear as shown in FIG. 19.

Thus the present invention and aspects thereof provide a communications device which can be utilised in a form such as a pager for receiving information or as a two way pager or mobile telephone or radio or as part of a computer to allow received signals to be listened to and, in several embodiments, signals to be transmitted. The ability to detach a part for listening to the message received and wearing the same on the ear, or placing to the same to the ear while sending information by talking into another part which is worn or in the vicinity of the user allows the device to be used hands free. Furthermore, the device can provide the same facilities as much larger and relatively bulky devices.

I claim:

1. A portable communication device, comprising a first part and a second part, the first part being retained by the second part when not in use but being readily detached from the second part when in use, wherein the first part includes wireless receiving means for reception of a communication signal and speaker means for audio reproduction of a received communication signal, the first part being in the form of an ear piece self supportable on the ear of a user of the device without contacting any other portion of the user's head; and a second part constituted by the body of said device exclusive of said first part, said second part including wireless transmission means for transmitting a communication signal to the wireless receiving means of the first part and means including a first microphone for conversion of sound into a communication signal and a second, auxiliary microphone which is more sensitive than the first microphone and becomes effective upon detachment of said first part from the second part; there being no transmission means in said first part, whereby said first part is sufficiently compact and light to be supported on the user's ear following detachment from said second part.

2. A portable communication device according to claim 1, wherein the first part further includes retaining means for keeping it in contact with the user's ear.

3. A portable communication device according to claim 2, wherein the second part has a storage location therein for the first part, and said retaining means retracts when the first part is placed in said storage location.

4. A portable communication device according to claim 1, wherein when the first part is not in use it is attached to the second part in a storage location thereon.

5. A portable communication device according to claim 1, wherein the receiving means in said first part is for wireless reception of a communication signal transmitted by the transmission means in said second part, said second part including further receiving means for wireless reception of a communication signal from an external source, and said second part also including means for emitting sound or light when a communication signal is received by said further receiving means and means for relaying said received communication signal to said first part immediately or following storage thereof in said second part.

6. A portable communication device according to claim 5, wherein the second part further comprises a memory for intermediate storage of a received signal and from which the stored signal can be relayed to the first part when the first part is placed on the ear of the user.

7. A portable communication device according to claim 1, wherein the second part is comprised in a computer and the first part is detachably affixed to said computer when the device is not in use.

8. A portable communication device according to claim 7, wherein the receiving means in the first part is for reception of communication signals generated by said computer.

9. A portable communication device according to claim 1, wherein the receiving means in the first part is further adapted to receive communication signals transmitted thereto from an external source.

10. A portable communication device according to claim 1, further comprising control means for selecting as between operation of either of said microphones.

11. A portable communication device according to claim 4, wherein the second, auxiliary microphone is disposed adjacent the storage location and is covered by the first part when in the storage location and is uncovered and effective when the first part has been detached.

* * * * *